Patented Oct. 9, 1951

2,570,503

UNITED STATES PATENT OFFICE 2,570,503

PROCESS OF PREPARING ESTERS OF AMINE-SUBSTITUTED PHOSPHONIC ACIDS

Pliny O. Tawney, Passaic, N. J., assignor to United States Rubber Company, New York, N. Y., a corporation of New Jersey No Drawing. Application May 11, 1949,
Serial No. 92,739

5 Claims. (Cl. 260—461)

This invention relates to a method of preparing organophosphorus compounds. More particularly, the invention relates to the alkaline catalyzed addition of primary and secondary aliphatic amines to esters of ethenephosphonic acid. In another aspect, it relates to a new chemical compound.

It is an object of my invention to provide a new method of preparing useful organophosphorus compounds.

The compounds obtained from the practice of my invention are useful as intermediates in the synthesis of other chemicals, and as plasticizers, insecticides, heat transfer agents, lubricants, hydraulic fluids and textile-treating materials.

It is known that, in the presence of alkaline catalysts, compounds containing an active or acidic hydrogen atom may undergo addition reactions with various ethylenically unsaturated compounds such as esters of alpha-unsaturated carboxylic acids, in which the ethylenically unsaturated group is activated by virtue of its conjugated relationship to the carbonyl group. I have now discovered that primary and secondary aliphatic amines will undergo addition reaction with ethylenically unsaturated compounds in which the ethylenic group is in conjugated relationship to the group

It has not heretofore been known that ethenephosphonic acid esters would behave in this way.

Specifically, I have discovered that primary and secondary aliphatic saturated amines will react with esters of ethenephosphonic acid to give a series of useful organophosphorus compounds. The reaction may be illustrated by the following equation:

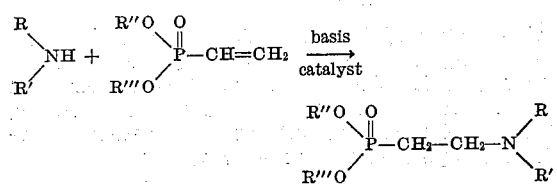

wherein R is selected from the class consisting of hydrogen and alkyl groups, R' is an alkyl group, and R'' and R''' are selected from the class consisting of alkyl, aryl, alkaryl and aralkyl groups.

Any aliphatic saturated primary or secondary amine may be used in the practice of my invention. Examples are methyl, dimethyl, ethyl, diethyl, n-propyl, isopropyl, diisopropyl, n-butyl and sec.-butyl amines and the primary and secondary amyl, hexyl, heptyl, octyl and higher amines. Usually the amine will contain from 1 to 20 carbon atoms per molecule.

A wide variety of esters of ethenephosphonic acid may be used in the practice of my invention. The substituent groups, R'' and R''' in the above equation, may be the same or different. Examples of alkyl groups include methyl, ethyl, isopropyl, n-butyl, sec.-amyl, hexyl, etc. Examples of aryl groups include phenyl, biphenylyl, naphthyl, etc. Examples of alkaryl groups include xylyl, tolyl, ethylphenyl, etc., while examples of aralkyl groups include benzyl, phenylethyl, etc.

The reaction is typically effected by heating a mixture of the amine and the ester of ethenephosphonic acid, preferably in the presence of a basic catalyst, at an elevated temperature which may conveniently range from 40° to 150° C., a temperature of from 80° to 100° C. often being preferred. It is often preferred to carry out the reaction under reflux conditions. The pressure is usually atmospheric although superatmospheric pressures may be used.

It is preferred to have present either an excess of the amine or a suitable added inert diluent (e. g., benzene) in the reaction mixture in order to keep the reaction mixture fluid during the reaction. In the case of certain of the lower amines, e. g., diethyl amine, n-propyl amine, diisopropyl amine, n-butyl amine, etc. it is often preferred to use an excess of amine itself to serve as the diluent. In the case of the higher amines, which are relatively more expensive, it is often preferred to use an added inert diluent. In either case the reaction is most advantageously carried out at the temperature of reflux of the mixture.

It is preferred to use an amount of the amine at least equal to that amount which is stoichiometrically equivalent to the ester of ethenephosphonic acid. This insures complete utilization of the relatively expensive ethenephosphonic acid ester reactant.

The preferred catalyst is an alkali metal salt (RR'NM, where R is a hydrogen or alkyl and R' is alkyl and M is an alkali metal) of the amine used as a reactant. This catalyst is most conveniently made by dissolving the alkali metal in a suitable excess of the amine, the resulting solution being used directly in the reaction. Sodium metal is preferred for this purpose. However, other alkali metals such as potassium, lithium, etc. may be used.

Other basic materials may be used as catalysts in carrying out the addition reaction of the present invention. Examples include oxides, hydroxides and alcoholates of alkali metals, oxides and hydroxides of alkaline earth metals such as calcium, barium, strontium, etc. Less preferably, the reaction may be carried out in the absence of any added catalyst.

The reaction is preferably carried out under substantially anhydrous conditions which are easily attained by the use of anhydrous reactants and by carrying out the reaction in such a manner that access of extraneous moisture is prevented. In the case of low molecular weight amines it will be necessary, because of the low boiling points of these materials, to carry out the reaction in a closed system under greater than atmospheric pressure.

The reaction is preferably continued until the ester of ethenephosphonic acid has been substantially completely combined. The duration of the reaction may vary widely. Following the attainment of the desired completeness of reaction, the addition reaction product is recovered from the reaction mixture in any suitable manner. In the case of the lower-boiling products, their recovery may conveniently be effected by vacuum distillation.

The following examples disclose my invention in more detail. All parts are by weight.

Example 1

To a solution of 0.1 part of sodium in 45 parts of diethylamine, 54 parts of diethyl ethenephosphonate are added. The solution is allowed to stand at room temperature for several days and is then heated for 5 hours at 90° C. It is then distilled in vacuo to obtain 66 parts of diethyl 2-diethylaminoethanephosphonate, B. P. 95–7° C./0.8 mm.

|  | Percent P | Percent N |
|---|---|---|
| Analysis: |  |  |
| Found | 12.09 | 6.06 |
| Theory | 13.08 | 5.95 |

Example 2

To a solution of 0.5 part of sodium methylate in 73 parts of normal butylamine, 16.4 parts of diethyl ethenephosphonate are added. The solution is heated under reflux for 4 hours. The excess amine is then removed in vacuo and the residue is dissolved in 70 parts of absolute diethyl ether. To this solution there is added 0.6 part of acetic acid to neutralize the alkali metal catalyst. The precipitated sodium acetate is removed by filtration and the filtrate is placed under vacuum at room temperature to remove the ether. There are obtained 23.3 parts of a colorless, slightly viscous liquid, 22.3 parts of which are distilled to give 14.4 parts of a new compound, diethyl-2-n-butyl-aminoethanephosphonate, B. P. 104–107° C./0.2 mm., $n_D^{20}=1.4410$. The compound is soluble in water, giving a strongly basic solution.

|  | Percent P | Percent N |
|---|---|---|
| Analysis: |  |  |
| Found | 5.84 | 13.29 |
| Theory | 5.90 | 13.08 |

The amount of catalyst required to effect the reaction is very small, commonly ranging from 0.01 mole to 0.20 mole per mole of the ester of ethenephosphonic acid.

Having thus described my invention, what I claim and desire to protect by Letters Patent is:

1. The process which comprises effecting addition reaction of a compound chosen from the class consisting of primary and secondary aliphatic saturated amines with an ester of ethenephosphonic acid having the formula

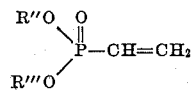

where R″ and R‴ are selected from the class consisting of alkyl, aryl, alkaryl and aralkyl groups under anhydrous conditions and thereby forming a compound of the type formula

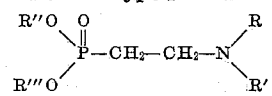

where R is selected from the class consisting of hydrogen and alkyl groups, R′ is an alkyl group, and R″ and R‴ are as before.

2. The process which comprises effecting addition reaction of a compound chosen from the class consisting of primary and secondary aliphatic saturated amines with an ester of ethenephosphonic acid having the formula

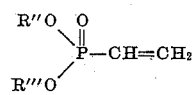

where R″ and R‴ are selected from the class consisting of alkyl, aryl, alkaryl and aralkyl groups under anhydrous conditions in the presence of a basic catalyst selected from the group consisting of alkali metal salts of said amine, alkali metal oxides, hydroxides and alcoholates, and alkaline earth metal oxides and hydroxides and thereby forming a compound having the formula

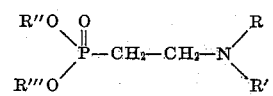

where R is selected from the class consisting of hydrogen and alkyl groups, R′ is an alkyl group, and R″ and R‴ are as before.

3. The process which comprises effecting addition reaction of a compound chosen from the class consisting of primary and secondary aliphatic saturated amines with an ester of ethenephosphonic acid having the formula

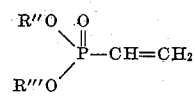

where R″ and R‴ are selected from the class consisting of alkyl, aryl, alkaryl and aralkyl groups by heating a mixture of said ester, said amine and the alkali metal salt of said amine, under anhydrous conditions and thereby forming a compound having the formula

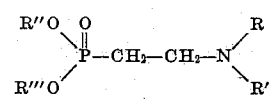

where R is selected from the class consisting of hydrogen and alkyl groups, R′ is an alkyl group, and R″ and R‴ are as before.

4. The process which comprises effecting addition reaction of diethylamine and diethyl ethenephosphonate under anhydrous conditions in the presence of a basic catalyst selected from the group consisting of alkali metal salts of said amine, alkali metal oxides, hydroxides and alcoholates, and alkaline earth metal oxides and hydroxides and thereby forming a compound having the formula

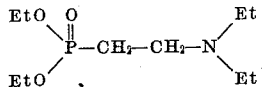

5. The process which comprises effecting addition reaction of n-butylamine and diethyl ethenephosphonate under anhydrous conditions in the presence of a basic catalyst selected from the group consisting of alkali metal salts of said amine, alkali metal oxides, hydroxides and alcoholates, and alkaline earth metal oxides and hydroxides and thereby forming a compound having the formula

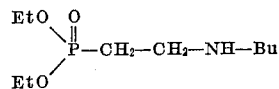

PLINY O. TAWNEY.

REFERENCES CITED

The following references are of record in the file of this patent:

Kosolapoff: J. Am. Chem. Soc., vol. 69, pp. 2112–2113 (1947).

Kosolapoff: J. Am. Chem. Soc., vol. 70, pp. 1971–1972 (1948).

Kabachnik: Bull acad. sci. U. R. S. S. Classe sci. chim. (1947), pp. 233–234 as abstracted in Chem. Abstr., vol. 42, col. 4132 (1948).